US012657518B2

(12) United States Patent     (10) Patent No.:   US 12,657,518 B2

Ali et al.             (45) Date of Patent:     Jun. 16, 2026

---

(54) ENABLEMENT OF FEDERATED MACHINE LEARNING FOR TERMINALS TO IMPROVE THEIR MACHINE LEARNING CAPABILITIES

(71) Applicant: NOKIA TECHNOLOGIES OY, Espoo (FI)

(72) Inventors: Samad Ali, Oulu (FI); Anna Pantelidou, Massy (FR); Rauli Jarkko Kullervo Järvelä, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 560 days.

(21) Appl. No.: 18/266,004

(22) PCT Filed: Jan. 25, 2021

(86) PCT No.: PCT/EP2021/051607

§ 371 (c)(1),
(2) Date: Jun. 8, 2023

(87) PCT Pub. No.: WO2022/156910

PCT Pub. Date: Jul. 28, 2022

(65) Prior Publication Data

US 2024/0028961 A1     Jan. 25, 2024

(51) Int. Cl.
*G06N 20/00*         (2019.01)

(52) U.S. Cl.
CPC .................................. *G06N 20/00* (2019.01)

(58) Field of Classification Search
CPC ...... G06N 20/00; G06N 20/20; H04L 43/067; H04L 41/0806; H04L 41/145; H04L 41/16; H04W 24/02
See application file for complete search history.

(56) References Cited

U.S. PATENT DOCUMENTS 11,844,145 B2 * 12/2023 Elshafie .............. H04L 25/0226
2021/0203565 A1 * 7/2021 Arora ........................ G06N 5/04
(Continued)

FOREIGN PATENT DOCUMENTS

CN     110263908 A    9/2019
CN     110598870 A    12/2019
(Continued)

OTHER PUBLICATIONS

International Seach Report & Written Opinion dated Sep. 21, 2021 corresponding to International Patent Application No. PCT/EP2021/051607.
(Continued)

*Primary Examiner* — Maher N Algibhah
(74) *Attorney, Agent, or Firm* — Barta Jones, PLLC

(57)          ABSTRACT

There are provided measures for enablement of federated machine learning for terminals to improve their machine learning capabilities. Such measures exemplarily comprise, at a terminal, receiving a configuration indicative of an instruction to participate in federated learning of a global machine learning model, the configuration including timing information related to said federated learning, and performing, based on said configuration, a machine learning process based on undertaken network performance related measurements, wherein said timing information includes a time limit with respect to a local machine learning model resulting from said machine learning process, and said time limit is a specification of a moment in time by when said local machine learning model is to be completed or a specification of a moment in time by when transmission of said local machine learning model is to be completed, and wherein said configuration is a minimization of drive tests configuration.

20 Claims, 11 Drawing Sheets

(56) References Cited

U.S. PATENT DOCUMENTS

| | | | | |
|---|---|---|---|---|
| 2022/0182802 A1 * | 6/2022 | Pezeshki | ............... | H04W 72/21 |
| 2024/0205781 A1 * | 6/2024 | Li | ......................... | H04W 36/32 |

FOREIGN PATENT DOCUMENTS

| | | | | |
|---|---|---|---|---|
| CN | 111538598 A | 8/2020 | | |
| WO | WO-2021179191 A1 * | 9/2021 | ............ | H04W 28/04 |
| WO | 2022/028664 A1 | 2/2022 | | |
| WO | 2022/028665 A1 | 2/2022 | | |
| WO | WO-2024035641 A1 * | 2/2024 | ............ | H04W 24/10 |

OTHER PUBLICATIONS

3GPP TR 23.700-91 V17.0.0 (Dec. 2020), Technical Report, 3rd Generation Partnership Project; Technical Specification Group Services and System Aspects; Study on enablers for network automation for the 5G System (5GS); Phase 2 (Release 17), Dec. 17, 2020, XP051999941.

3GPP TR 22.874 V0.2.0 (Nov. 2020), Technical Report, 3rd Generation Partnership Project; Technical Specification Group Services and System Aspects; Study on traffic characteristics and performance requirements for AI/ML model transfer in 5GS (Release 18), Nov. 30, 2020, XP051963920.

3GPP TS 38.401 V16.4.0 (Jan. 2021), Technical Specification, 3rd Generation Partnership Project; Technical Specification Group Radio Access Network; NG-RAN; Architecture description (Release 16), Jan. 2021.

Konecny et al., "Federated Optimization: Distributed Optimization Beyond the Datacenter", arXiv, Nov. 11, 2015, pp. 1-5.

Niknam et al., "Federated Learning for Wireless Communications: Motivation, Opportunities, and Challenges", IEEE Communications Magazine, vol. 58, No. 06, Jul. 15, 2020, pp. 46-51.

Tran et al., "Federated Learning over Wireless Networks: Optimization Model Design and Analysis", IEEE INFOCOM—IEEE Conference on Computer Communications, Apr. 29-May 2, 2019, pp. 1387-1395.

"Revised SID: Study on enhancement for data collection for NR and ENDC", 3GPP TSG RAN Meeting #89e, RP-201620, CMCC, Agenda Item: 9.7.13, Sep. 14-18, 2020, 4 pages.

Konecny et al., "Federated Learning: Strategies for Improving Communication Efficiency", arXiv, Oct. 18, 2016, pp. 1-5.

Office action received for corresponding European Patent Application No. 21701981.9, dated Dec. 3, 2024, 6 pages.

* cited by examiner receiving circuitry 31 transmitting circuitry 32 network node (CU) 30

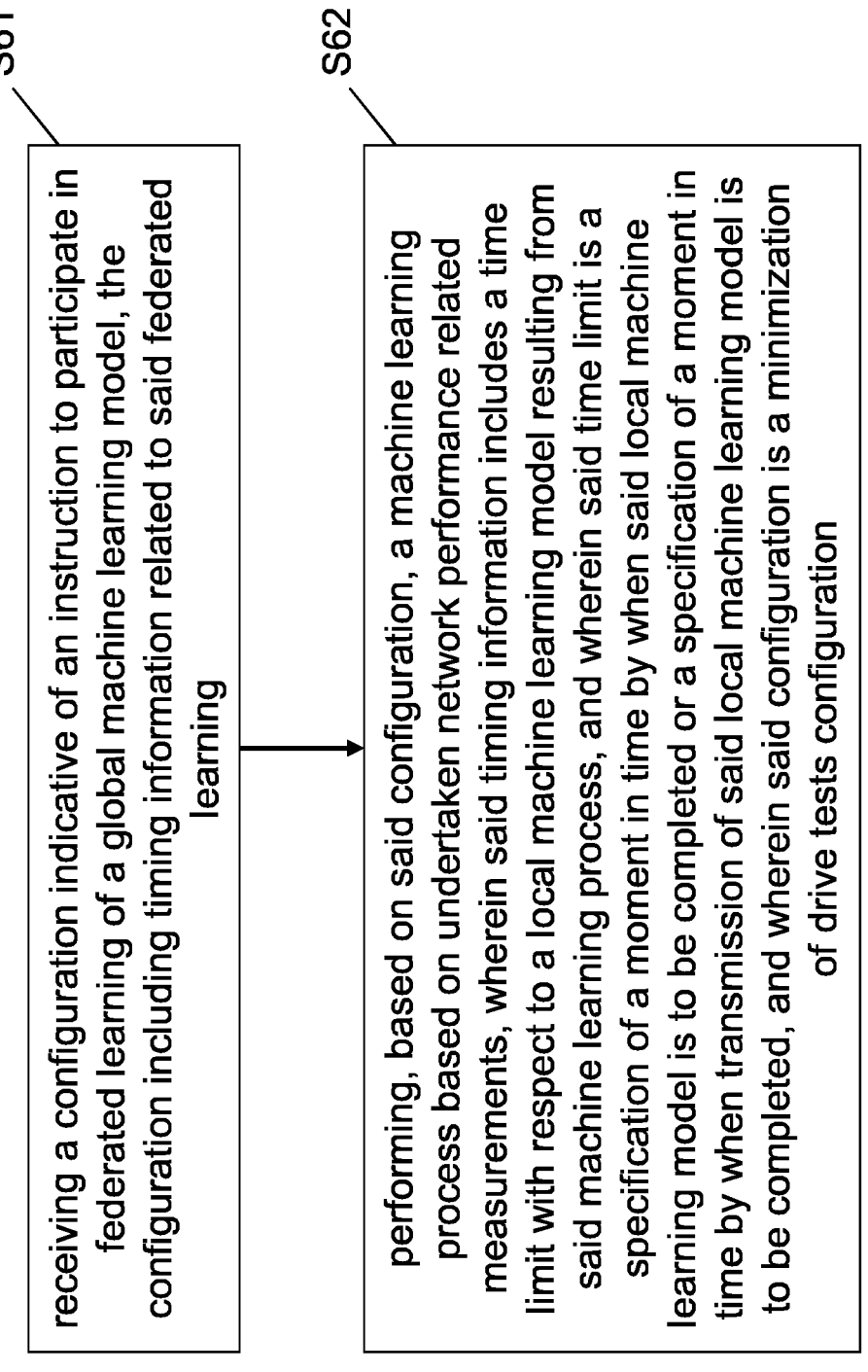

S61 receiving a configuration indicative of an instruction to participate in federated learning of a global machine learning model, the configuration including timing information related to said federated learning

S62 performing, based on said configuration, a machine learning process based on undertaken network performance related measurements, wherein said timing information includes a time limit with respect to a local machine learning model resulting from said machine learning process, and wherein said time limit is a specification of a moment in time by when said local machine learning model is to be completed or a specification of a moment in time by when transmission of said local machine learning model is to be completed, and wherein said configuration is a minimization of drive tests configuration

Fig. 6

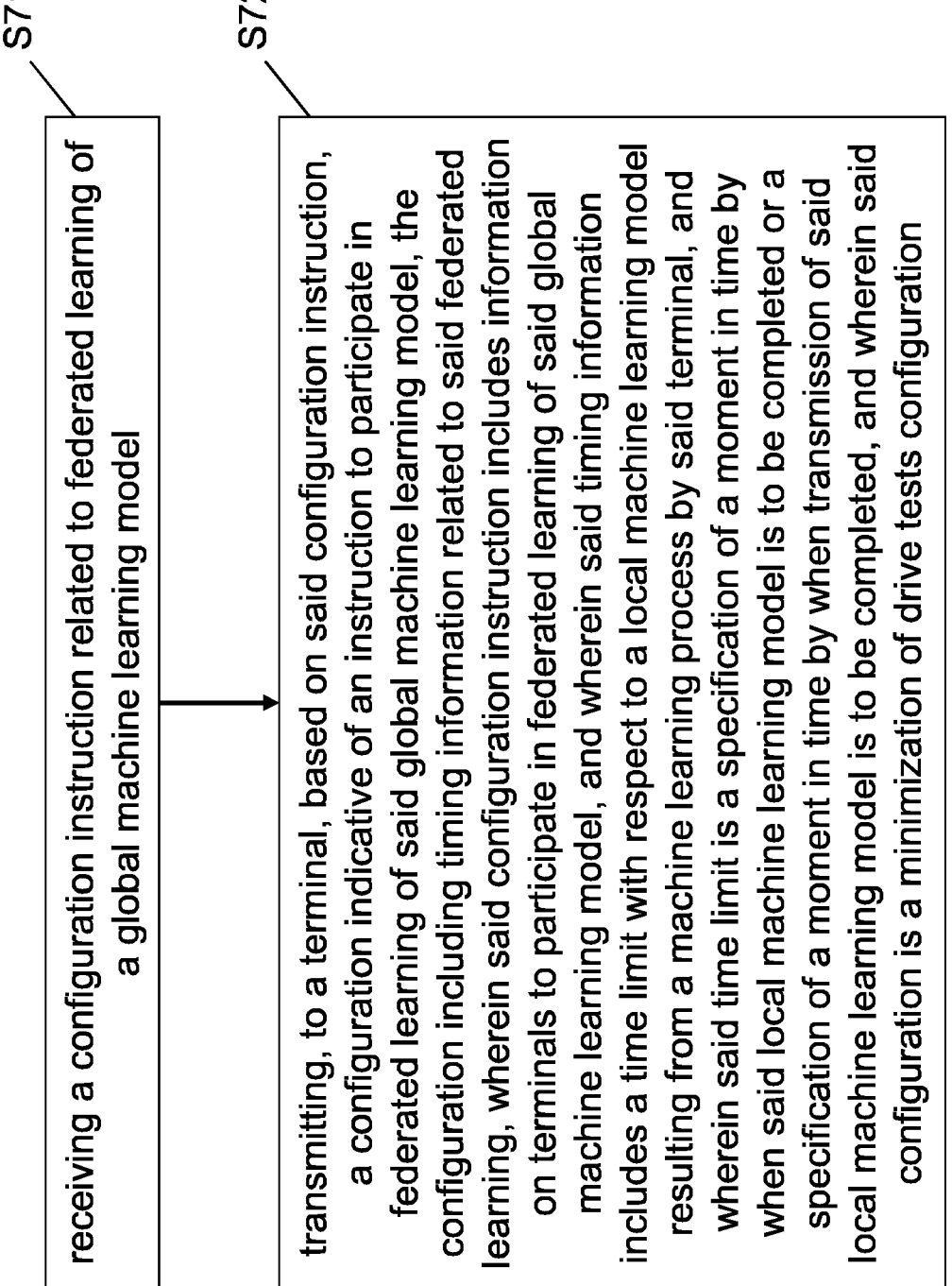

S71 receiving a configuration instruction related to federated learning of a global machine learning model

S72 transmitting, to a terminal, based on said configuration instruction, a configuration indicative of an instruction to participate in federated learning of said global machine learning model, the configuration including timing information related to said federated learning, wherein said configuration instruction includes information on terminals to participate in federated learning of said global machine learning model, and wherein said timing information includes a time limit with respect to a local machine learning model resulting from a machine learning process by said terminal, and wherein said time limit is a specification of a moment in time by when said local machine learning model is to be completed or a specification of a moment in time by when transmission of said local machine learning model is to be completed, and wherein said configuration is a minimization of drive tests configuration

Fig. 7

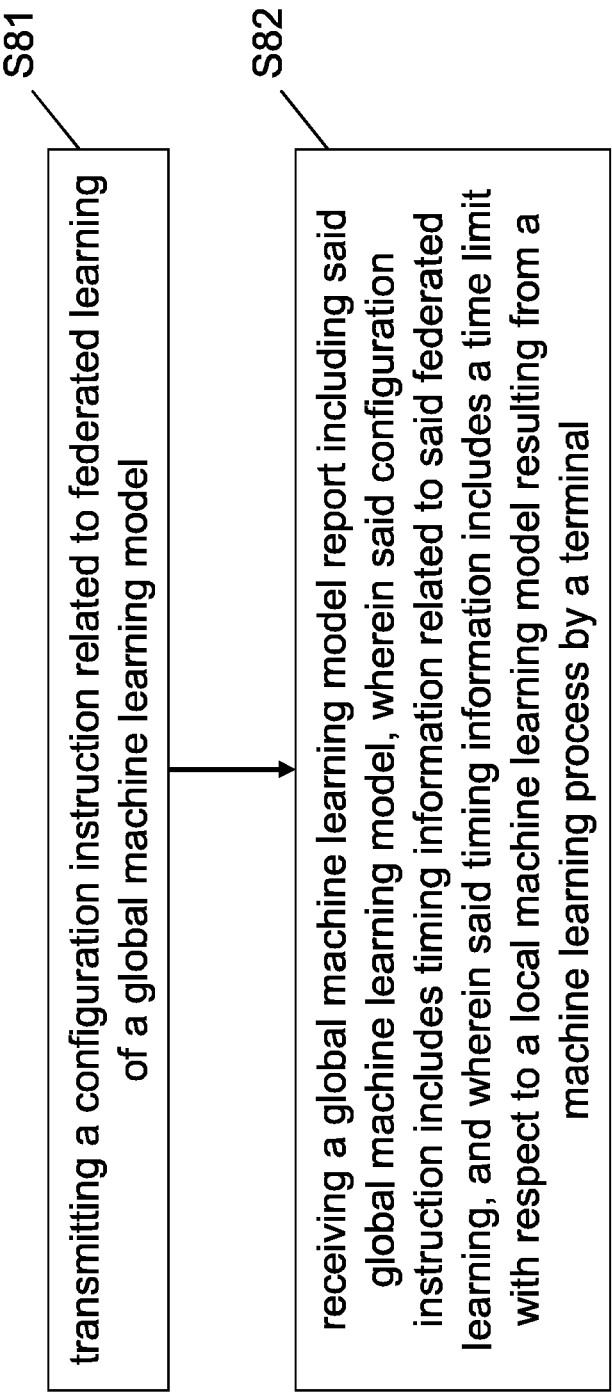

S81 transmitting a configuration instruction related to federated learning of a global machine learning model

S82 receiving a global machine learning model report including said global machine learning model, wherein said configuration instruction includes timing information related to said federated learning, and wherein said timing information includes a time limit with respect to a local machine learning model resulting from a machine learning process by a terminal

Fig. 8

Global model

Local model

ENABLEMENT OF FEDERATED MACHINE LEARNING FOR TERMINALS TO IMPROVE THEIR MACHINE LEARNING CAPABILITIES

FIELD

Various example embodiments relate to enablement of federated machine learning for terminals to improve their machine learning capabilities. More specifically, various example embodiments exemplarily relate to measures (including methods, apparatuses and computer program products) for realizing enablement of federated machine learning for terminals to improve their machine learning capabilities.

BACKGROUND

The present specification generally relates to federated learning. Federated learning is a paradigm in which a global machine learning (ML) model is distributed between local machines to train the model using private/local data sets of local machines. Federated learning has several benefits that are as follows.

On the one hand, the processing power at the local clients is utilized. On the other hand, the data privacy of the local clients is preserved, since the data is locally used to train the models. Furthermore, communication load is reduced, since the local data is not transferred to the central unit for training purposes.

Federated learning requires communication networks for the ML model transfer between the local clients and the central processing unit. In wireless settings, the central client can be a gNodeB (gNB) or a cloud computing server. Local clients may be terminals as user equipments (UE). Federated learning can be used to update ML models for wireless networks, especially at the transmitter and receivers to update ML models at different blocks. By moving towards ML-based communications systems, different components of the transmitter or receiver are modeled and replaced by ML models. This is because ML models, once trained and deployed, are much simpler compared to the traditional algorithms.

As a result, there are many efforts to design ML based communication systems. For example, ML models can be used to replace complex digital pre-distortion (DPD) units for power amplifiers (PA), or ML models can be used to replace the entire receiver chain.

Therefore, deployed ML models are going to be one of the main components of the communication systems.

On the other hand, most of the communication devices are mobile phones that have high computational power, and some high-end models are even equipped with chips that are capable of performing ML training tasks (some models use for example a chip (System-on-a-Chip (SoC)) that has a neural engine).

As a result, a UE is capable of training ML models. UEs can use training samples and pilots during communications to upgrade the ML models such as receiver ML models to perform better and improve over time.

Since each device will train to improve these models locally, it will be highly beneficial to use these locally trained models to improve the models of all UEs.

Federated learning, in which the locally trained models are transmitted to a central location, and after being combined by specific federated learning methods, are transmitted to the UEs, can be used to improve the performance of the ML models at UEs.

FIG. 9 shows a schematic diagram of an example of a system environment with signaling variants according to example embodiments, and in particular schematically illustrates a diagram of a federated learning process.

As is illustrated in FIG. 9 showing the concept of federated learning, UEs train their local models and send the trained local models to a central unit. Once the central unit combines the local models, it broadcasts the resulting global model to the UEs.

That is, in federated learning, the UEs must send their local model to the gNB for an averaging process and an updating of the global model. Updating the global model takes place at certain intervals at the gNB (or a central location). Therefore, the timing for the transmission of the locally trained model from the UE to the gNB is critical.

Hence, the problem arises that the time critical transmission of the locally trained model from the UE to the gNB are to be governed in particular in order to improve terminals' ML capabilities.

Hence, there is a need to provide for enablement of federated machine learning for terminals to improve their machine learning capabilities.

SUMMARY

Various example embodiments aim at addressing at least part of the above issues and/or problems and drawbacks.

Various aspects of example embodiments are set out in the appended claims.

According to an example aspect, there is provided a method comprising receiving a configuration indicative of an instruction to participate in federated learning of a global machine learning model, the configuration including timing information related to said federated learning, and performing, based on said configuration, a machine learning process based on undertaken network performance related measurements, wherein said timing information includes a time limit with respect to a local machine learning model resulting from said machine learning process, and said time limit is a specification of a moment in time by when said local machine learning model is to be completed or a specification of a moment in time by when transmission of said local machine learning model is to be completed, and wherein said configuration is a minimization of drive tests configuration.

According to an example aspect, there is provided a method comprising receiving a configuration instruction related to federated learning of a global machine learning model, and transmitting, to a terminal, based on said configuration instruction, a configuration indicative of an instruction to participate in federated learning of said global machine learning model, the configuration including timing information related to said federated learning, wherein said configuration instruction includes information on terminals to participate in federated learning of said global machine learning model, said timing information includes a time limit with respect to a local machine learning model resulting from a machine learning process by said terminal, and said time limit is a specification of a moment in time by when said local machine learning model is to be completed or a specification of a moment in time by when transmission of said local machine learning model is to be completed, and wherein said configuration is a minimization of drive tests configuration.

According to an example aspect, there is provided a method comprising transmitting a configuration instruction related to federated learning of a global machine learning model, and receiving a global machine learning model report including said global machine learning model, wherein said configuration instruction includes timing information related to said federated learning, wherein said timing information includes a time limit with respect to a local machine learning model resulting from a machine learning process by a terminal.

According to an example aspect, there is provided an apparatus comprising receiving circuitry configured to receive a configuration indicative of an instruction to participate in federated learning of a global machine learning model, the configuration including timing information related to said federated learning, and performing circuitry configured to perform, based on said configuration, a machine learning process based on undertaken network performance related measurements, wherein said timing information includes a time limit with respect to a local machine learning model resulting from said machine learning process, and said time limit is a specification of a moment in time by when said local machine learning model is to be completed or a specification of a moment in time by when transmission of said local machine learning model is to be completed, and wherein said configuration is a minimization of drive tests configuration.

According to an example aspect, there is provided an apparatus comprising receiving circuitry configured to receive a configuration instruction related to federated learning of a global machine learning model, and transmitting circuitry configured to transmit, to a terminal, based on said configuration instruction, a configuration indicative of an instruction to participate in federated learning of said global machine learning model, the configuration including timing information related to said federated learning, wherein said configuration instruction includes information on terminals to participate in federated learning of said global machine learning model, said timing information includes a time limit with respect to a local machine learning model resulting from a machine learning process by said terminal, and said time limit is a specification of a moment in time by when said local machine learning model is to be completed or a specification of a moment in time by when transmission of said local machine learning model is to be completed, and wherein said configuration is a minimization of drive tests configuration.

According to an example aspect, there is provided an apparatus comprising transmitting circuitry configured to transmit a configuration instruction related to federated learning of a global machine learning model, and receiving circuitry configured to receive a global machine learning model report including said global machine learning model, wherein said configuration instruction includes timing information related to said federated learning, wherein said timing information includes a time limit with respect to a local machine learning model resulting from a machine learning process by a terminal.

According to an example aspect, there is provided an apparatus comprising at least one processor, at least one memory including computer program code, and at least one interface configured for communication with at least another apparatus, the at least one processor, with the at least one memory and the computer program code, being configured to cause the apparatus to perform receiving a configuration indicative of an instruction to participate in federated learning of a global machine learning model, the configuration including timing information related to said federated learning, and performing, based on said configuration, a machine learning process based on undertaken network performance related measurements, wherein said timing information includes a time limit with respect to a local machine learning model resulting from said machine learning process, and said time limit is a specification of a moment in time by when said local machine learning model is to be completed or a specification of a moment in time by when transmission of said local machine learning model is to be completed, and wherein said configuration is a minimization of drive tests configuration.

According to an example aspect, there is provided an apparatus comprising at least one processor, at least one memory including computer program code, and at least one interface configured for communication with at least another apparatus, the at least one processor, with the at least one memory and the computer program code, being configured to cause the apparatus to perform receiving a configuration instruction related to federated learning of a global machine learning model, and transmitting, to a terminal, based on said configuration instruction, a configuration indicative of an instruction to participate in federated learning of said global machine learning model, the configuration including timing information related to said federated learning, wherein said configuration instruction includes information on terminals to participate in federated learning of said global machine learning model, said timing information includes a time limit with respect to a local machine learning model resulting from a machine learning process by said terminal, and said time limit is a specification of a moment in time by when said local machine learning model is to be completed or a specification of a moment in time by when transmission of said local machine learning model is to be completed, and wherein said configuration is a minimization of drive tests configuration.

According to an example aspect, there is provided an apparatus comprising at least one processor, at least one memory including computer program code, and at least one interface configured for communication with at least another apparatus, the at least one processor, with the at least one memory and the computer program code, being configured to cause the apparatus to perform transmitting a configuration instruction related to federated learning of a global machine learning model, and receiving a global machine learning model report including said global machine learning model, wherein said configuration instruction includes timing information related to said federated learning, wherein said timing information includes a time limit with respect to a local machine learning model resulting from a machine learning process by a terminal.

According to an example aspect, there is provided a computer program product comprising computer-executable computer program code which, when the program is run on a computer (e.g. a computer of an apparatus according to any one of the aforementioned apparatus-related exemplary aspects of the present disclosure), is configured to cause the computer to carry out the method according to any one of the aforementioned method-related exemplary aspects of the present disclosure.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient timing design of the transmission of local models from at least one UE (from the local entity, e.g. a terminal) to the gNB (to the central entity, e.g. a network node, or more particular, an access node), and the transmission of the global model from the gNB (from the central entity, e.g. the network node, or more particular, the access node) to one or more UEs (to the local entities, e.g. the terminals) to thereby solve at least part of the problems and drawbacks identified in relation to the prior art.

By way of example embodiments, there is provided enablement of federated machine learning for terminals to improve their machine learning capabilities. More specifically, by way of example embodiments, there are provided measures and mechanisms for realizing enablement of federated machine learning for terminals to improve their machine learning capabilities.

Thus, improvement is achieved by methods, apparatuses and computer program products enabling/realizing enablement of federated machine learning for terminals to improve their machine learning capabilities.

BRIEF DESCRIPTION OF THE DRAWINGS

In the following, the present disclosure will be described in greater detail by way of non-limiting examples with reference to the accompanying drawings, in which:

FIG. 6 is a schematic diagram of a procedure according to example embodiments, FIG. 7 is a schematic diagram of a procedure according to example embodiments, FIG. 8 is a schematic diagram of a procedure according to example embodiments.

DETAILED DESCRIPTION

Figure 1:
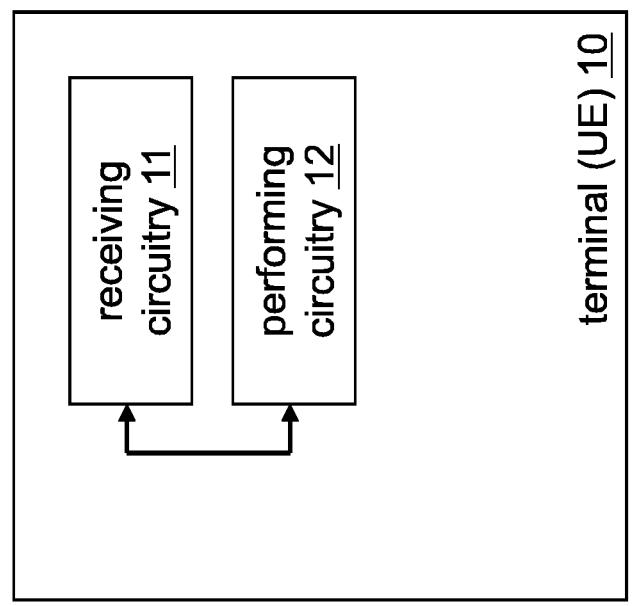
FIG. 1 is a block diagram illustrating an apparatus according to example embodiments.

The present disclosure is described herein with reference to particular non-limiting examples and to what are presently considered to be conceivable embodiments. A person skilled in the art will appreciate that the disclosure is by no means limited to these examples, and may be more broadly applied.

It is to be noted that the following description of the present disclosure and its embodiments mainly refers to specifications being used as non-limiting examples for certain exemplary network configurations and deployments. Namely, the present disclosure and its embodiments are mainly described in relation to 3GPP specifications being used as non-limiting examples for certain exemplary network configurations and deployments. As such, the description of example embodiments given herein specifically refers to terminology which is directly related thereto. Such terminology is only used in the context of the presented non-limiting examples, and does naturally not limit the disclosure in any way. Rather, any other communication or communication related system deployment, etc. may also be utilized as long as compliant with the features described herein.

Hereinafter, various embodiments and implementations of the present disclosure and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to example embodiments, in general terms, there are provided measures and mechanisms for (enabling/ realizing) enablement of federated machine learning for terminals to improve their machine learning capabilities.

As mentioned above, in federated learning, the UEs must send their local model to the gNB for an averaging process and an updating of the global model, while updating the global model takes place at certain intervals at the gNB (or a central location). Therefore, the timing for the transmission of the locally trained model from the UE to the gNB is critical. In order to address this issue, example embodiments focus on the timing design of the transmission of local models from at least one UE (from the local entity, e.g. a terminal) to the gNB (to the central entity, e.g. a network node, or more particular, an access node) and the transmission of the global model from the gNB (from the central entity, e.g. the network node, or more particular, the access node) to one or more UEs (to the local entities, e.g. the terminals).

Hence, according to example embodiments, the coordination of federated learning models between a centralized entity and a set of UEs is introduced. The centralized entity may be the Core (Network) or operations and maintenance (OAM) (an OAM entity). The centralized entity may alternatively be a gNB or another access node (network node). The centralized entity in case of split architectures may be a gNB-CU (TS 38.401).

According to example embodiments, upon an indication of the UE's capability to support federated learning by the UE to the gNB, the gNB sends a minimization of drive tests (MDT) configuration with training timing information on the federated model that will be used by the UE for training.

According to example embodiments, training timing information may include a deadline by which the trained ML model needs to be reported by the UE. Additionally, training timing information may include a periodic training data reporting configuration through which the UE can report training-related information such as a probability of completion of training by the deadline or a training completion percentage or a remaining time to the deadline to the network.

According to example embodiments, the UE may also indicate to the gNB that the UE is unable to train the ML model by the deadline. Depending on the reason of this inability, the network can take different actions (e.g., using a different UE for training if the UE is not connected to a power source).

According to alternative example embodiments, the gNB can send a training status request message to a connected UE through which the gNB polls the training status of the federated learning model at the UE.

According to example embodiments, the UE responds to the training status request (message) with a training status response message.

According to example embodiments, when the UE has trained an ML model for federated learning, the UE sends a weight associated with the ML model to the network upon training completion. The UE may additionally send the MDT configuration used for the training to the network. The network can combine the weights to build the original ML model.

Above-outlined example embodiments are illustrated below in more general terms.

FIG. 1 is a block diagram illustrating an apparatus according to example embodiments. The apparatus may be a terminal 10 such as a user equipment comprising a receiving circuitry 11 and a performing circuitry 12. The receiving circuitry 11 receives a configuration indicative of an instruction to participate in federated learning of a global machine learning model, the configuration including timing information related to said federated learning. The performing circuitry 12 performs, based on said configuration, a machine learning process based on undertaken network performance related measurements. The timing information includes a time limit with respect to a local machine learning model resulting from said machine learning process. Further, the time limit is a specification of a moment in time by when said local machine learning model is to be completed or a specification of a moment in time by when transmission of said local machine learning model is to be completed. Furthermore, the configuration is a minimization of drive tests configuration. FIG. 6 is a schematic diagram of a procedure according to example embodiments. The apparatus according to FIG. 1 may perform the method of FIG. 6 but is not limited to this method. The method of FIG. 6 may be performed by the apparatus of FIG. 1 but is not limited to being performed by this apparatus.

As shown in FIG. 6, a procedure according to example embodiments comprises an operation of receiving (S61) a configuration indicative of an instruction to participate in federated learning of a global machine learning model, the configuration including timing information related to said federated learning, and an operation of performing (S62), based on said configuration, a machine learning process based on undertaken network performance related measurements. The timing information includes a time limit with respect to a local machine learning model resulting from said machine learning process. Further, the time limit is a specification of a moment in time by when said local machine learning model is to be completed or a specification of a moment in time by when transmission of said local machine learning model is to be completed. Furthermore, the configuration is a minimization of drive tests configuration.

Figure 2:
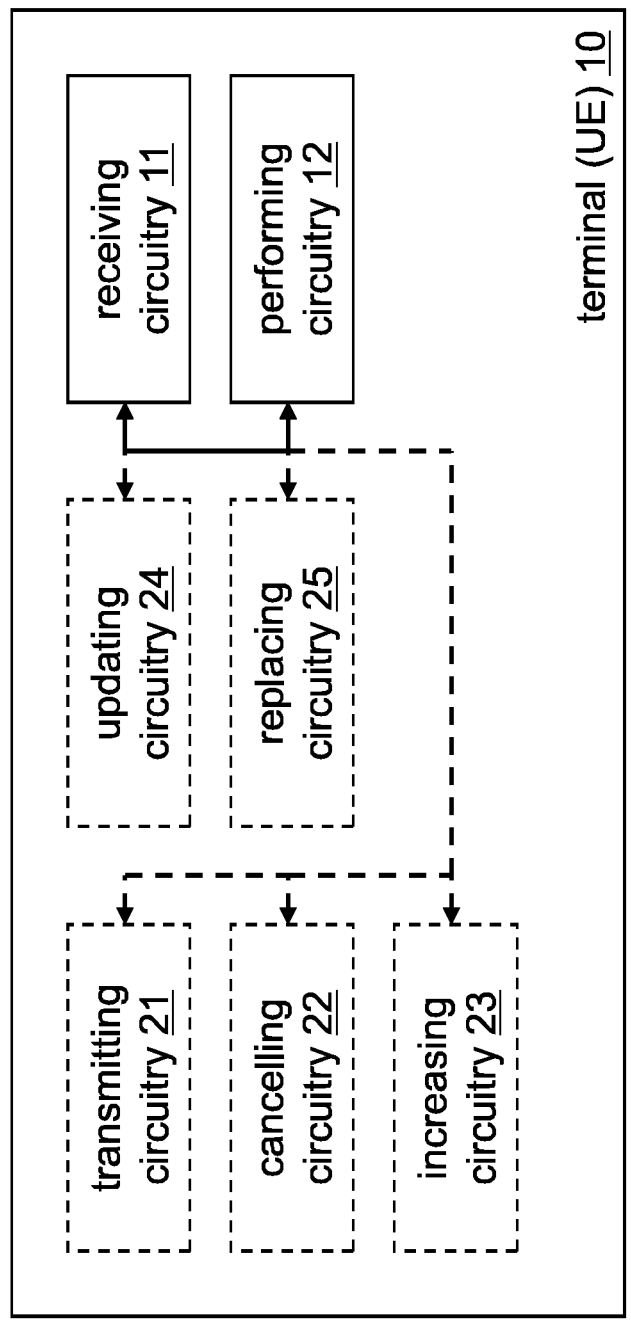
FIG. 2 is a block diagram illustrating an apparatus according to example embodiments.

FIG. 2 is a block diagram illustrating an apparatus according to example embodiments. In particular, FIG. 2 illustrates a variation of the apparatus shown in FIG. 1. The apparatus according to FIG. 2 may thus further comprise a transmitting circuitry 21, a cancelling circuitry 22, an increasing circuitry 23, an updating circuitry 24, and/or a replacing circuitry 25.

In an embodiment at least some of the functionalities of the apparatus shown in FIG. 1 (or 2) may be shared between two physically separate devices forming one operational entity. Therefore, the apparatus may be seen to depict the operational entity comprising one or more physically separate devices for executing at least some of the described processes.

According to further example embodiments, said timing information includes a specification of a timing of a periodic learning status report.

According to a variation of the procedure shown in FIG. 6, exemplary additional operations are given, which are inherently independent from each other as such. According to such variation, an exemplary method according to example embodiments may comprise an operation of transmitting, based on said timing of said periodic learning status report, said periodic learning status report.

According to a variation of the procedure shown in FIG. 6, exemplary additional operations are given, which are inherently independent from each other as such. According to such variation, an exemplary method according to example embodiments may comprise an operation of receiving a request for a requested learning status report, and an operation of transmitting said requested learning status report.

According to a variation of the procedure shown in FIG. 6, exemplary additional operations are given, which are inherently independent from each other as such. According to such variation, an exemplary method according to example embodiments may comprise an operation of receiving a request for a requested periodic learning status report including a specification of a timing of said requested periodic learning status report, and an operation of transmitting, based on said timing of said requested periodic learning status report, said requested periodic learning status report.

According to further example embodiments, said periodic learning status report and/or said requested learning status report and/or said requested periodic learning status report comprises at least one of a probability that said time limit is kept, progress information with respect to said machine learning process, and an estimated time for said machine learning process to be completed.

According to a variation of the procedure shown in FIG. 6, exemplary additional operations are given, which are inherently independent from each other as such. According to such variation, an exemplary method according to example embodiments may comprise an operation of transmitting an indication of inability to keep said time limit.

According to further example embodiments, said indication of inability to keep said time limit includes information on a reason for said inability to keep said time limit.

According to a variation of the procedure shown in FIG. 6, exemplary additional operations are given, which are inherently independent from each other as such. According to such variation, an exemplary method according to example embodiments may comprise an operation of receiving a federated learning cancellation message, and an operation of cancelling said machine learning process based on said federated learning cancellation message.

According to further example embodiments, said federated learning cancellation message includes a reason for cancellation of participation in federated learning of said global machine learning model.

According to a variation of the procedure shown in FIG. 6, exemplary additional operations are given, which are inherently independent from each other as such. According to such variation, an exemplary method according to example embodiments may comprise an operation of receiving a configuration modification related to participation in federated learning of said global machine learning model, wherein said configuration modification includes at least an indication of an increased frequency of network performance related measurements, and an operation of increasing said frequency of said undertaken network performance related measurements based on said configuration modification.

According to a variation of the procedure shown in FIG. 6, exemplary additional operations are given, which are inherently independent from each other as such. According to such variation, an exemplary method according to example embodiments may comprise an operation of transmitting, upon completion of said machine learning process, a local machine learning model message including said local machine learning model. Here, said local machine learning model message includes a weight associated with said local machine learning model.

According to a variation of the procedure shown in FIG. 6, exemplary additional operations are given, which are inherently independent from each other as such. According to such variation, an exemplary method according to example embodiments may comprise an operation of receiving a global machine learning model, and an operation of updating said local machine learning model based on said global machine learning model. According to a further variation of the procedure shown in FIG. 6, exemplary details of the updating operation are given, which are inherently independent from each other as such. Such exemplary updating operation according to example embodiments may comprise an operation of replacing said local machine learning model by said global machine learning model.

According to a variation of the procedure shown in FIG. 6, exemplary additional operations are given, which are inherently independent from each other as such. According to such variation, an exemplary method according to example embodiments may comprise an operation of transmitting an indication of capability to participate in federated learning.

Figure 3:
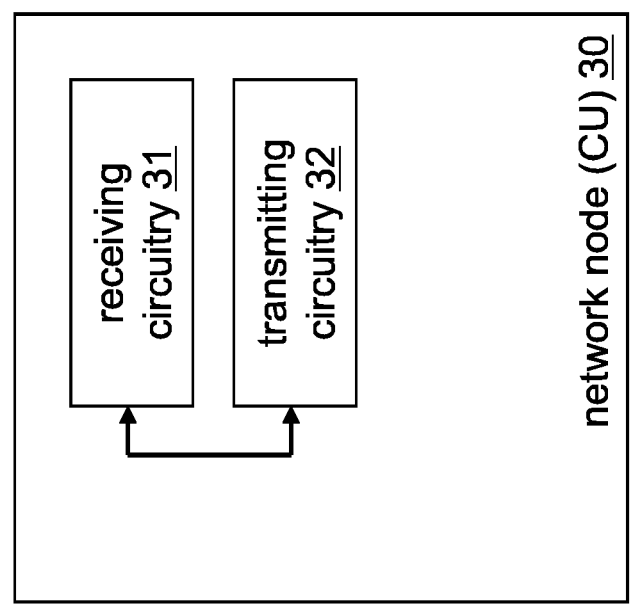
FIG. 3 is a block diagram illustrating an apparatus according to example embodiments.

FIG. 3 is a block diagram illustrating an apparatus according to example embodiments. The apparatus may be a network node (e.g. access node) 30 such as a base station or a central unit (CU) of such base station comprising a receiving circuitry 31 and a transmitting circuitry 32. The receiving circuitry 31 receives a configuration instruction related to federated learning of a global machine learning model. The transmitting circuitry 32 transmits, to a terminal, based on said configuration instruction, a configuration indicative of an instruction to participate in federated learning of said global machine learning model, the configuration including timing information related to said federated learning. The configuration instruction includes information on terminals to participate in federated learning of said global machine learning model. Further, the timing information includes a time limit with respect to a local machine learning model resulting from a machine learning process by said terminal. Still further, the time limit is a specification of a moment in time by when said local machine learning model is to be completed or a specification of a moment in time by when transmission of said local machine learning model is to be completed. Furthermore, the configuration is a minimization of drive tests configuration. FIG. 7 is a schematic diagram of a procedure according to example embodiments. The apparatus according to FIG. 3 may perform the method of FIG. 7 but is not limited to this method. The method of FIG. 7 may be performed by the apparatus of FIG. 3 but is not limited to being performed by this apparatus.

As shown in FIG. 7, a procedure according to example embodiments comprises an operation of receiving (S71) a configuration instruction related to federated learning of a global machine learning model, and an operation of transmitting (S72), to a terminal, based on said configuration instruction, a configuration indicative of an instruction to participate in federated learning of said global machine learning model, the configuration including timing information related to said federated learning. The configuration instruction includes information on terminals to participate in federated learning of said global machine learning model. Further, the timing information includes a time limit with respect to a local machine learning model resulting from a machine learning process by said terminal. Still further, the time limit is a specification of a moment in time by when said local machine learning model is to be completed or a specification of a moment in time by when transmission of said local machine learning model is to be completed. Furthermore, the configuration is a minimization of drive tests configuration.

Figure 4:
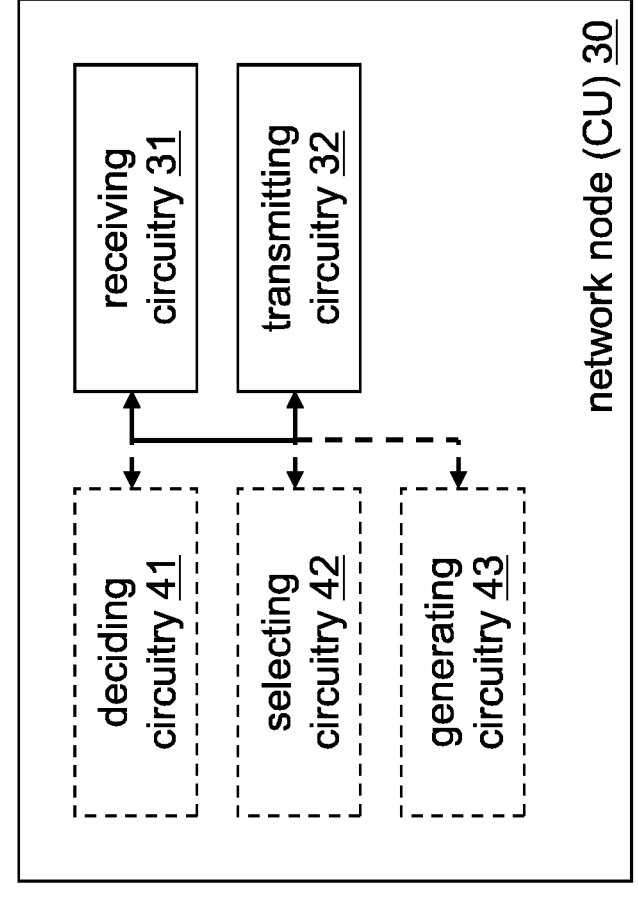
FIG. 4 is a block diagram illustrating an apparatus according to example embodiments.

FIG. 4 is a block diagram illustrating an apparatus according to example embodiments. In particular, FIG. 4 illustrates a variation of the apparatus shown in FIG. 3. The apparatus according to FIG. 4 may thus further comprise a deciding circuitry 41, a selecting circuitry 42, and/or a generating circuitry 43.

In an embodiment at least some of the functionalities of the apparatus shown in FIG. 3 (or 4) may be shared between two physically separate devices forming one operational entity. Therefore, the apparatus may be seen to depict the operational entity comprising one or more physically separate devices for executing at least some of the described processes.

According to further example embodiments, said timing information includes a specification of a timing of a periodic learning status report.

According to a variation of the procedure shown in FIG. 7, exemplary additional operations are given, which are inherently independent from each other as such. According to such variation, an exemplary method according to example embodiments may comprise an operation of receiving said periodic learning status report.

According to a variation of the procedure shown in FIG. 7, exemplary additional operations are given, which are inherently independent from each other as such. According to such variation, an exemplary method according to example embodiments may comprise an operation of transmitting a request for a requested learning status report, and an operation of receiving said requested learning status report.

According to a variation of the procedure shown in FIG. 7, exemplary additional operations are given, which are inherently independent from each other as such. According to such variation, an exemplary method according to example embodiments may comprise an operation of transmitting a request for a requested periodic learning status report including a specification of a timing of said requested periodic learning status report, and an operation of receiving said requested periodic learning status report.

According to further example embodiments, said periodic learning status report and/or said requested learning status report and/or said requested periodic learning status report comprises at least one of a probability that said time limit is kept, progress information with respect to said machine learning process, and an estimated time for said machine learning process to be completed.

According to a variation of the procedure shown in FIG. 7, exemplary additional operations are given, which are inherently independent from each other as such. According to such variation, an exemplary method according to example embodiments may comprise an operation of deciding, based on said periodic learning status report and/or said requested learning status report and/or said requested periodic learning status report, whether to cancel participation of said terminal in federated learning of said global machine learning model, and an operation of, if decided to cancel participation of said terminal in federated learning of said global machine learning model, transmitting a federated learning cancellation message to said terminal.

According to a variation of the procedure shown in FIG. 7, exemplary additional operations are given, which are inherently independent from each other as such. According to such variation, an exemplary method according to example embodiments may comprise an operation of receiving, from said terminal, an indication of inability to keep said time limit, and an operation of transmitting a federated learning cancellation message to said terminal.

According to further example embodiments, said federated learning cancellation message includes a reason for cancellation of participation in federated learning of said global machine learning model.

According to a variation of the procedure shown in FIG. 7, exemplary additional operations are given, which are inherently independent from each other as such. According to such variation, an exemplary method according to example embodiments may comprise an operation of selecting a replacement terminal for replacement of said terminal in participation in federated learning of said global machine learning model.

According to a variation of the procedure shown in FIG. 7, exemplary additional operations are given, which are inherently independent from each other as such. According to such variation, an exemplary method according to example embodiments may comprise an operation of receiving, from said terminal, an indication of inability to keep said time limit, and an operation of transmitting, to said terminal, a configuration modification related to participation of said terminal in federated learning of said global machine learning model, wherein said configuration modification includes at least an indication of an increased frequency of network performance related measurements.

According to further example embodiments, said indication of inability to keep said time limit includes information on a reason for said inability to keep said time limit.

According to a variation of the procedure shown in FIG. 7, exemplary additional operations are given, which are inherently independent from each other as such. According to such variation, an exemplary method according to example embodiments may comprise an operation of receiving, from a plurality of terminals including said terminal, a respective local machine learning model message including a respective local machine learning model, and an operation of generating a global machine learning model based on said respective local machine learning models. Here, said respective local machine learning model messages include respective weights associated with said respective local machine learning models.

According to a variation of the procedure shown in FIG. 7, exemplary additional operations are given, which are inherently independent from each other as such. According to such variation, an exemplary method according to example embodiments may comprise an operation of transmitting said global machine learning model to said terminal.

According to a variation of the procedure shown in FIG. 7, exemplary additional operations are given, which are inherently independent from each other as such. According to such variation, an exemplary method according to example embodiments may comprise an operation of transmitting a global machine learning model report including said global machine learning model.

According to further example embodiments, said global machine learning model report includes at least one of said configuration and respective weights associated with said respective local machine learning models.

According to a variation of the procedure shown in FIG. 7, exemplary additional operations are given, which are inherently independent from each other as such. According to such variation, an exemplary method according to example embodiments may comprise an operation of receiving, from said terminal, an indication of capability to participate in federated learning.

According to further example embodiments, said configuration instruction includes said timing information related to said federated learning.

According to further example embodiments, said configuration instruction includes an upload time indicative of an estimated duration of an upload of said local machine learning model resulting from said machine learning process by said terminal from said terminal. The upload time is an estimate of how long it takes before a model is uploaded at a UE. If a time for training is to be figured out, according to example embodiments, the upload time is to be subtracted from the deadline.

Figure 5:
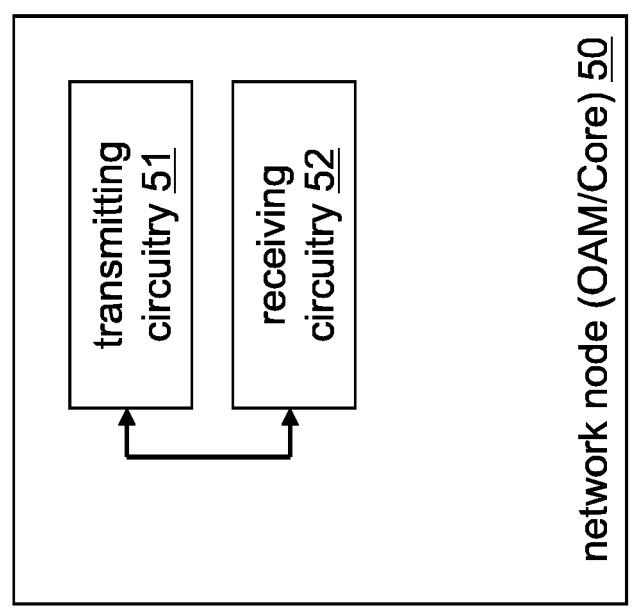
FIG. 5 is a block diagram illustrating an apparatus according to example embodiments.
Figure 9:
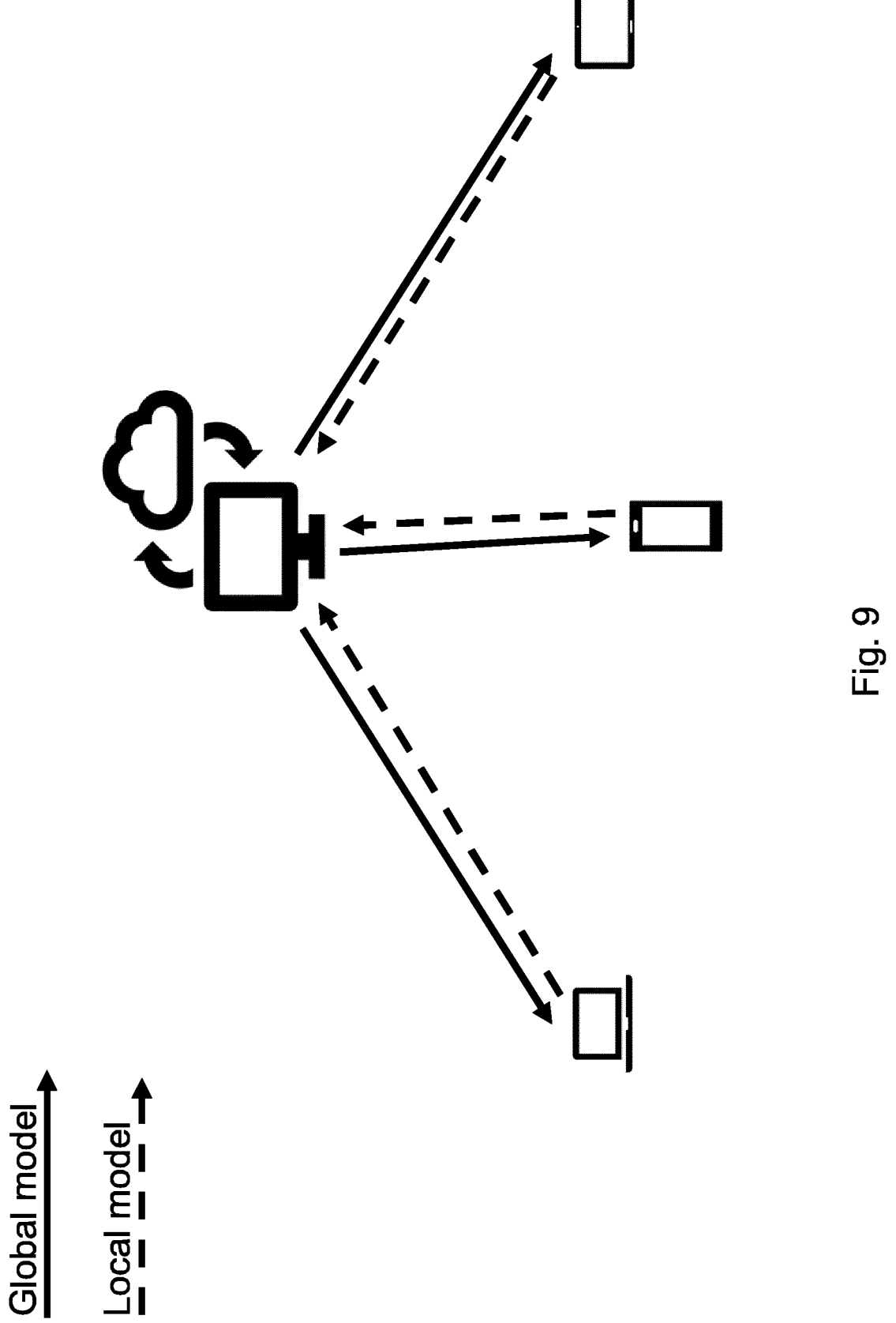
FIG. 9 shows a schematic diagram of an example of a system environment with signaling variants according to example embodiments.

FIG. 5 is a block diagram illustrating an apparatus according to example embodiments. The apparatus may be a network node 50 such as operation and maintenance entity or a core network entity comprising a transmitting circuitry 51 and a receiving circuitry 52. The transmitting circuitry 51 transmits a configuration instruction related to federated learning of a global machine learning model. The receiving circuitry 52 receives a global machine learning model report including said global machine learning model. The configuration instruction includes timing information related to said federated learning. Further, the timing information includes a time limit with respect to a local machine learning model resulting from a machine learning process by a terminal. FIG. 8 is a schematic diagram of a procedure according to example embodiments. The apparatus according to FIG. 5 may perform the method of FIG. 8 but is not limited to this method. The method of FIG. 8 may be performed by the apparatus of FIG. 5 but is not limited to being performed by this apparatus.

As shown in FIG. 8, a procedure according to example embodiments comprises an operation of transmitting (S81) a configuration instruction related to federated learning of a global machine learning model, and an operation of receiving (S82) a global machine learning model report including said global machine learning model. The configuration instruction includes timing information related to said federated learning. Further, the timing information includes a time limit with respect to a local machine learning model resulting from a machine learning process by a terminal.

In an embodiment at least some of the functionalities of the apparatus shown in FIG. 5 may be shared between two physically separate devices forming one operational entity. Therefore, the apparatus may be seen to depict the operational entity comprising one or more physically separate devices for executing at least some of the described processes.

According to further example embodiments, said time limit is a specification of a moment in time by when said local machine learning model is to be completed.

According to further example embodiments, said time limit is a specification of a moment in time by when transmission of said local machine learning model is to be completed.

According to further example embodiments, said configuration instruction includes information on terminals to participate in federated learning of said global machine learning model.

According to further example embodiments, said timing information includes an upload time indicative of an estimated duration of an upload of said local machine learning model resulting from said machine learning process by said terminal from said terminal.

According to further example embodiments, said global machine learning model report includes at least one of a configuration generated for terminals instructed to participate in federated learning of said global machine learning model based on said configuration instruction and respective weights associated with respective local machine learning models resulting from machine learning processes by respective terminals participating in federated learning of said global machine learning model.

Above-discussed example embodiments are explained below in more specific terms.

As discussed above, timing of the model exchange and federated averaging process is critical in successful utilization of the federated learning process. Thus, according to example embodiments, the models that are trained at the UEs must be transmitted to the managing centralized entity before a certain deadline. Moreover, according to example embodiments, the UEs must not re-train their (local) model before receiving the updated (global) model from the server, because the existing (local) model will be replaced by the global model after the download.

According to example embodiments, in the MDT configuration sent by the OAM or Core network, it is indicated that training at the UE (as an example for a terminal) will be part of federated learning. It is noted that, while the MDT configuration sent by the core network targets a single UE (i.e., the UE (as an example for a terminal)), the MDT configuration sent by the OAM may target a set of UEs including the UE (as an example for a terminal), e.g., based on cell-based or other area criteria. The MDT configuration includes training timing information with, e.g., an upload time (estimated upload duration), periodic reporting times of the status of training, and a deadline (time limit) before which the UE must send the trained ML model back to the gNB.

Specifically, according to example embodiments, the MDT configuration may identify the UEs participating into the federated learning by using management-based activation (UEs selected based on an area). The MDT configuration identifying the UEs participating into the federated learning by using management-based activation is preferred when the MDT configuration is sent by the OAM and targets a set of UEs. Further, according to example embodiments, the MDT configuration may identify the UEs participating into the federated learning by using signaling based activation (UEs selected through their International Mobile Subscriber Identities (IMSI) in signaling based activation). The MDT configuration identifying the UEs participating into the federated learning by using signaling based activation is preferred when the MDT configuration is sent by the core and targets a single UE.

If periodic reporting is configured in the MDT configuration, according to example embodiments, the UE periodically reports its ML model training status to the network (e.g. through the central unit of an access node/network node). For example, this can be in terms of a probability with which training will complete by the required time. Alternatively, this may include an estimated time for the training process to complete.

According to example embodiments, the UE may signal to the network (e.g. through the central unit of an access node/network node) its inability to train an ML model by the deadline. This signaling in one option can be sent in an RRC message such as one of the RRCReestablishmentComplete, RRCReconfigurationComplete, RRCResumeComplete, or RRCSetupComplete messages by the UE to the network (e.g. through the central unit of an access node/network node). As another alternative, a new RRC message can be defined for signaling UE's inability to train an ML model by the deadline. According to example embodiments, the UE can additionally include in the message a reason for this inability, e.g., not enough data available at the UE, MDT configuration providing insufficient measurements, not connected to a reliable power source, etc. As another example, if the UE is selected for example through management based methods, where a set of UEs residing in a certain area is chosen for federated learning, the UE may reject the configuration if it determines internally that it is not a suitable UE to train a model for federated learning. This can be for example the case, if the UE knows already from a previously received configuration that it was unable to obtain the required measurements to train its model (within the required deadline).

According to example embodiments, based on the UE inability reason to train an ML model, the network (e.g. through the central unit of an access node/network node) sends a training cancellation message or a different MDT configuration to the UE.

When sending a training cancellation message to the UE, the network may select a different UE for the training (if e.g., the reason for UE inability to train the model is that the UE is not connected to a reliable power source).

Through a different MDT configuration sent to the UE, the network requests more (frequent) measurements to be taken by the UE to train its ML model (if e.g., the reason for UE inability to train the model is that the UE does not have enough data or the MDT configuration does not provide sufficient measurements).

According to example embodiments, a Training Status Request message sent to a UE can be periodic (i.e. can request periodic training status reporting) or on demand (i.e. can request one-time training status reporting). Through the Training Status Request message, the gNB requests to know for example one of the following:

a) How much more training the ML model requires before completion (e.g., one more hour, or 20% more time), b) How much the ML model is trained (e.g., model has been trained for one day, or it is trained 80%), and c) A probability or other indication that the ML model training will complete before the configured deadline.

With the Training Status Response message in response to the Training Status Request message, the network can determine whether to continue training at a particular UE or cancel the MDT configuration for a given reason.

According to example embodiments, the Training Status Response message is sent by the UE either as a response to the Training Status Request message (in the on demand case) or periodically, with a period or cycle as indicated either in the Training Status Request message or in the initial MDT configuration sent to the UE.

According to example embodiments, after receiving information (the locally trained ML models) from the UEs, the CU can generate/update the (global) ML model and update, based thereon, the ML model at the UEs.

Figure 10:
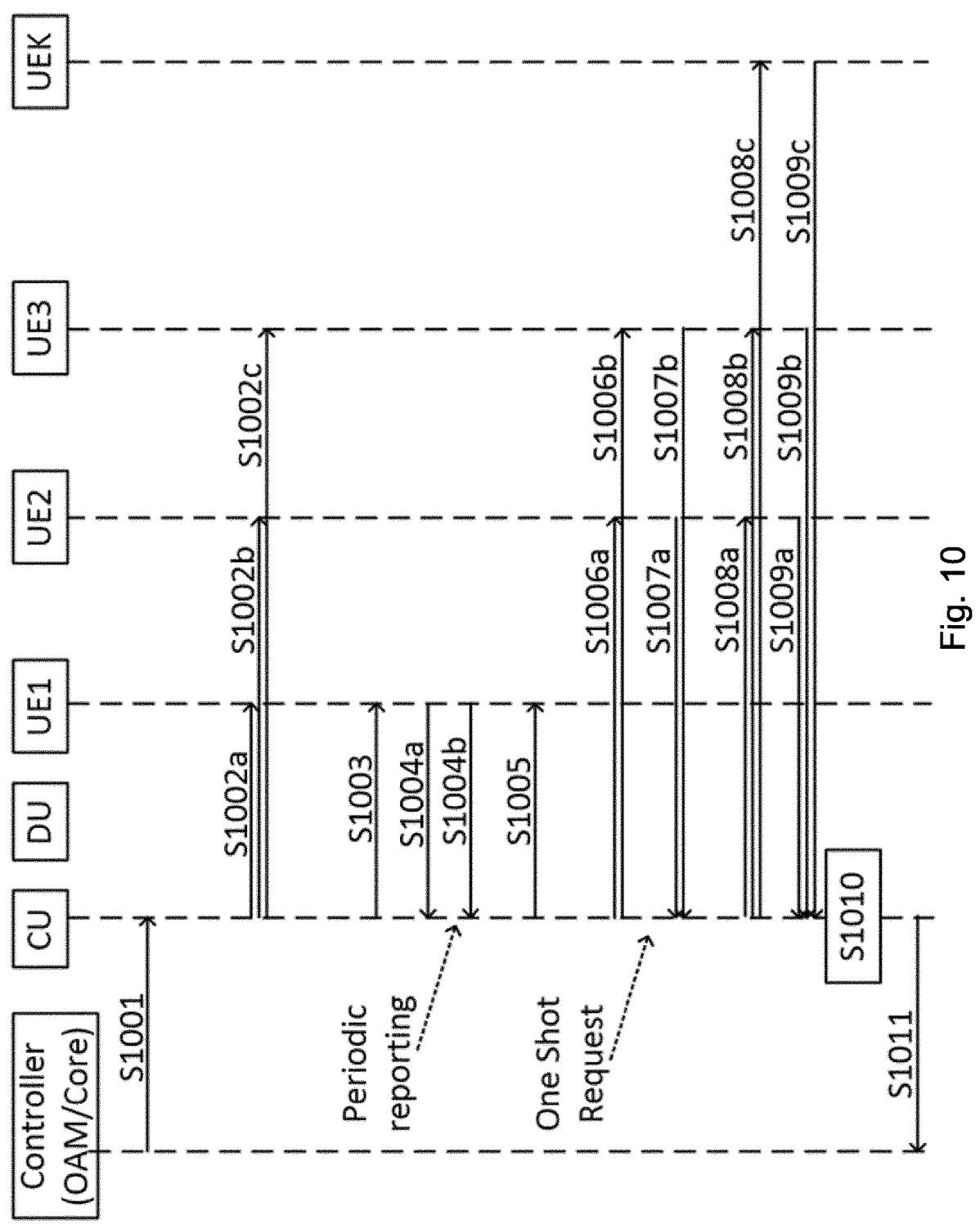
FIG. 10 shows a schematic diagram of signaling sequences according to example embodiments.

FIG. 10 shows a schematic diagram of signaling sequences according to example embodiments, and in particular illustrates selected processes according to example embodiments as discussed above.

In detail, FIG. 10 shows a scenario including a central control entity (e.g. OAM, core network entity), a CU, a distributed unit (DU), three UEs (UE1, UE2, UE3), and a further UEK.

In step S1001, an ML Model Training Instruction (e.g. "ML Model Training Instruction (MDT Configuration, federated learning, training timing information, ML model m, UEs to train the model)") is transmitted from the controller (OAM, core network entity) to the CU.

In response thereto, in steps S1002a, S1002b, and S1002c, a respective MDT Configuration (e.g. "MDT Configuration (Train ML model m, federated learning, start time, end time, measurement configuration)") is transmitted from the CU to respective UEs (UE1, UE2, UE3).

In step S1003, a Training Status Request (e.g. "Training Status Request (ML model m, Start time t, End time T, periodic, Every 10 mins)") is transmitted from the CU to the UE1. The Training Status Request transmitted in step S1003 requests periodic training status reporting ("periodic, Every 10 mins"). The exemplary "Start time t" and "End time T" indicate a time window in which the periodic reporting can take place.

In response thereto, in step S1004a, a Training Status Response (e.g. "Training Status Response (ML model m, Status: percentage of model trained/power saving pattern, time stamp ts)") is transmitted from the UE1 to the CU. The exemplary Training Status Response indicates, among others, a "power saving pattern" applied by UE1.

The information "Status not OK" indicating that the training cannot be finished before the deadline (for any possible reason) is transmitted as well.

After elapse of the time corresponding to the requested period, in step S1004b, a Training Status Response (e.g. "Training Status Response (ML model m, Status: percentage of model trained/power saving pattern, time stamp is +10 mins)") is transmitted from the UE1 to the CU. The exemplary The exemplary Training Status Response indicates, among others, a "power saving pattern" applied by UE1.

Again, the information "Status not OK" indicating that the training cannot be finished before the deadline (for any possible reason) is transmitted as well.

In response thereto, in step S1005, the CU may decide to cancel training by UE1, and an MDT Configuration (e.g. "MDT Configuration (Cancel Training ML model m, Reason: power saving pattern)") is transmitted from the CU to the UE1. The exemplary MDT Configuration indicates "power saving pattern" as a reason for cancellation of training by UE1.

In steps S1006a, S1006b, a respective Training Status Request (e.g. "Training Status Request (ML model m)") is transmitted from the CU to respective UEs (UE2, UE3). The Training Status Requests transmitted in steps S1006a, S1006b request one-time training status reporting.

In steps S1007a, S1007b, a respective Training Status Response (e.g. "Training Status Response (ML model m, Status: percentage of model trained/power saving pattern)") is transmitted from respective UEs (UE2, UE3) to the CU. The information "Status OK" indicating that the training can be finished before the deadline is transmitted as well.

In steps S1008a, S1008b, S1008c, a MDT Configuration (e.g. "MDT Configuration (Update ML model m)") is transmitted from the CU to respective UEs (UE2, UE3, UEK). As can be seen, the CU has selected UEK for the training as replacement for the cancelled UE1. Furthermore, in the previous steps, the information about the ML model was transmitted and UEs had to respond whether they can perform the task. For those that can perform the task, the main model is sent here.

In steps S1009a, S1009b, S1009c, a respective Trained ML model (e.g. "Trained ML model (ML model m, weight)") is transmitted from respective UEs (UE2, UE3, UEK) to the CU.

In response thereto, in step S1010, the CU generates a global ML model e.g. by combining the received trained ML models by specific federated learning methods e.g. by effecting an averaging process thereon. As a result, the global ML model (federated model) is ready.

In step S1011, a Report (e.g. "Report (ML model m, MDT Configuration, weights)") is transmitted from the CU to the controller (OAM, core network entity), reporting the global ML model (federated model) from step S1010.

The above-described procedures and functions may be implemented by respective functional elements, processors, or the like, as described below.

In the foregoing exemplary description of the network entity, only the units that are relevant for understanding the principles of the disclosure have been described using functional blocks. The network entity may comprise further units that are necessary for its respective operation. However, a description of these units is omitted in this specification. The arrangement of the functional blocks of the devices is not construed to limit the disclosure, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 11:
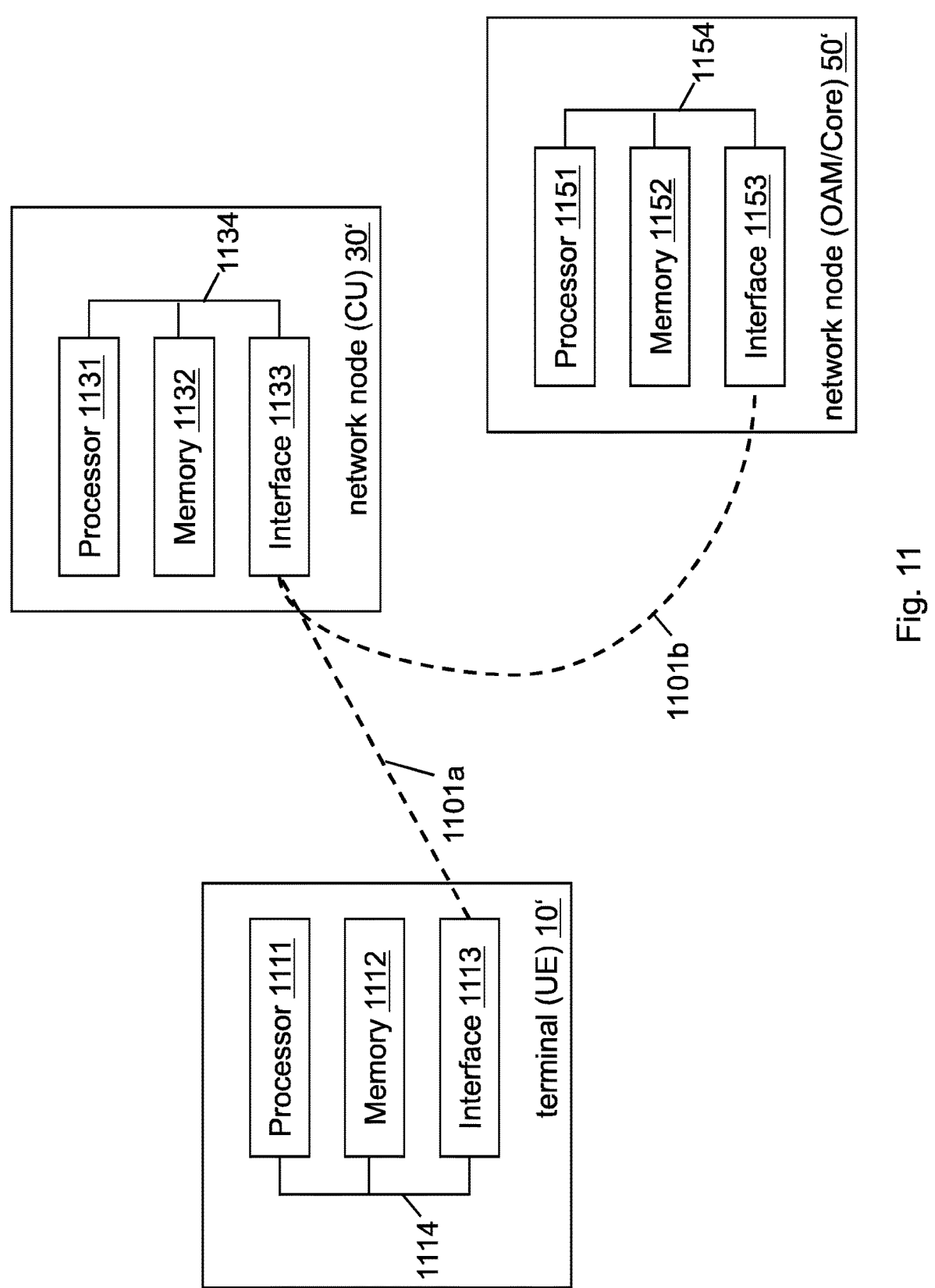
FIG. 11 is a block diagram alternatively illustrating apparatuses according to example embodiments.

In FIG. 11, an alternative illustration of apparatuses according to example embodiments is depicted. As indicated in FIG. 11, according to example embodiments, the apparatus (terminal) 10' (corresponding to the terminal 10) comprises a processor 1111, a memory 1112 and an interface 1113, which are connected by a bus 1114 or the like. Further, according to example embodiments, the apparatus (network node) 30' (corresponding to the network node 30) comprises a processor 1131, a memory 1132 and an interface 1133, which are connected by a bus 1134 or the like. Further, according to example embodiments, the apparatus (network node) 50' (corresponding to the network node 50) comprises a processor 1151, a memory 1152 and an interface 1153, which are connected by a bus 1154 or the like. The apparatuses may be connected via links 1101a, 1101b, respectively.

The processor 1111/1131/1151 and/or the interface 1113/1133/1153 may also include a modem or the like to facilitate communication over a (hardwire or wireless) link, respectively. The interface 1113/1133/1153 may include a suitable transceiver coupled to one or more antennas or communication means for (hardwire or wireless) communications with the linked or connected device(s), respectively. The interface 1113/1133/1153 is generally configured to communicate with at least one other apparatus, i.e. the interface thereof.

The memory 1112/1132/1152 may store respective programs assumed to include program instructions or computer program code that, when executed by the respective processor, enables the respective electronic device or apparatus to operate in accordance with the example embodiments.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to example embodiments, an apparatus representing the terminal 10 comprises at least one processor 1111, at least one memory 1112 including computer program code, and at least one interface 1113 configured for communication with at least another apparatus. The processor (i.e. the at least one processor 1111, with the at least one memory 1112 and the computer program code) is configured to perform receiving a configuration indicative of an instruction to participate in federated learning of a global machine learning model, the configuration including timing information related to said federated learning (thus the apparatus comprising corresponding means for receiving), and to perform performing, based on said configuration, a machine learning process based on undertaken network performance related measurements (thus the apparatus comprising corresponding means for performing), wherein said timing information includes a time limit with respect to a local machine learning model resulting from said machine learning process, said time limit is a specification of a moment in time by when said local machine learning model is to be completed or a specification of a moment in time by when transmission of said local machine learning model is to be completed, and said configuration is a minimization of drive tests configuration.

According to example embodiments, an apparatus representing the network node 30 comprises at least one processor 1131, at least one memory 1132 including computer program code, and at least one interface 1133 configured for communication with at least another apparatus. The processor (i.e. the at least one processor 1131, with the at least one memory 1132 and the computer program code) is configured to perform receiving a configuration instruction related to federated learning of a global machine learning model (thus the apparatus comprising corresponding means for receiving), and to perform transmitting, to a terminal, based on said configuration instruction, a configuration indicative of an instruction to participate in federated learning of said global machine learning model, the configuration including timing information related to said federated learning (thus the apparatus comprising corresponding means for transmitting), wherein said configuration instruction includes information on terminals to participate in federated learning of said global machine learning model, said timing information includes a time limit with respect to a local machine learning model resulting from a machine learning process by said terminal, said time limit is a specification of a moment in time by when said local machine learning model is to be completed or a specification of a moment in time by when transmission of said local machine learning model is to be completed, and said configuration is a minimization of drive tests configuration.

According to example embodiments, an apparatus representing the network node 50 comprises at least one processor 1151, at least one memory 1152 including computer program code, and at least one interface 1153 configured for communication with at least another apparatus. The processor (i.e. the at least one processor 1151, with the at least one memory 1152 and the computer program code) is configured to perform transmitting a configuration instruction related to federated learning of a global machine learning model (thus the apparatus comprising corresponding means for transmitting), and to perform receiving a global machine learning model report including said global machine learning model (thus the apparatus comprising corresponding means for receiving), wherein said configuration instruction includes timing information related to said federated learning, and said timing information includes a time limit with respect to a local machine learning model resulting from a machine learning process by a terminal.

For further details regarding the operability/functionality of the individual apparatuses, reference is made to the above description in connection with any one of FIGS. 1 to 10, respectively.

For the purpose of the present disclosure as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present disclosure. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present disclosure also covers any conceivable combination of method steps and operations described above, and any conceivable combination of nodes, apparatuses, modules or elements described above, as long as the above-described concepts of methodology and structural arrangement are applicable.

In view of the above, there are provided measures for enablement of federated machine learning for terminals to improve their machine learning capabilities. Such measures exemplarily comprise, at a terminal, receiving a configuration indicative of an instruction to participate in federated learning of a global machine learning model, the configuration including timing information related to said federated learning, and performing, based on said configuration, a machine learning process based on undertaken network performance related measurements, wherein said timing information includes a time limit with respect to a local machine learning model resulting from said machine learning process, and said time limit is a specification of a moment in time by when said local machine learning model is to be completed or a specification of a moment in time by when transmission of said local machine learning model is to be completed, and wherein said configuration is a minimization of drive tests configuration.

Even though the disclosure is described above with reference to the examples according to the accompanying drawings, it is to be understood that the disclosure is not restricted thereto. Rather, it is apparent to those skilled in the art that the present disclosure can be modified in many ways without departing from the scope of the inventive idea as disclosed herein.

LIST OF ACRONYMS AND ABBREVIATIONS

| | |
|---|---|
| 3GPP | Third Generation Partnership Project |
| CU | central unit |
| DPD | digital pre-distortion |
| DU | distributed unit |
| gNB | gNodeB |
| IMSI | International Mobile Subscriber Identity |
| MDT | minimization of drive tests |
| ML | machine learning |
| MPR | maximum power reduction |
| OAM | operations and maintenance |
| PA | power amplifier |
| SoC | System-on-a-Chip |
| UE | user equipment |

The invention claimed is:

1. A method comprising:

receiving a configuration indicative of an instruction to participate in federated learning of a global machine learning model, the configuration including timing information related to said federated learning, wherein the timing information includes a specification of a timing of a periodic learning status report;

performing, based on the configuration, a machine learning process based on undertaken network performance related measurements, wherein the timing information includes a time limit with respect to a local machine learning model resulting from the machine learning process, wherein the time limit is a specification of a moment in time by when the local machine learning model is to be completed or a specification of a moment in time by when transmission of the local machine learning model is to be completed, and wherein the configuration is a minimization of drive tests configuration;

transmitting, based on the timing of the periodic learning status report, the periodic learning status report;

receiving a request for a requested learning status report;

transmitting the requested learning status report;

receiving a request for a requested periodic learning status report including a specification of a timing of the requested periodic learning status report; and transmitting, based on the timing of the requested periodic learning status report, the requested periodic learning status report, wherein the periodic learning status report, the requested learning status report and the requested periodic learning status report comprises a probability that the time limit is kept, progress information with respect to the machine learning process, and an estimated time for the machine learning process to be completed;

receiving a configuration modification related to participation in federated learning of the global machine learning model, wherein the configuration modification includes at least an indication of an increased frequency of network performance related measurements; and increasing the frequency of the undertaken network performance related measurements based on the configuration modification.

2. The method according to claim 1, further comprising:

transmitting, upon completion of the machine learning process, a local machine learning model message including the local machine learning model, wherein the local machine learning model message includes a weight associated with the local machine learning model.

3. The method according to claim 2, further comprising:

receiving a global machine learning model; and updating the local machine learning model based on the global machine learning model, wherein in relation to the updating, the method further comprises replacing the local machine learning model by the global machine learning model.

4. The method according to claim 3, further comprising:

transmitting an indication of capability to participate in federated learning.

5. The method according to claim 4, further comprising:

transmitting an indication of inability to keep the time limit.

6. The method according to claim 5, wherein the indication of inability to keep the time limit includes information on a reason for the inability to keep the time limit.

7. The method according to claim 6, further comprising:

receiving a federated learning cancellation message; and cancelling the machine learning process based on the federated learning cancellation message.

8. The method according to claim 7, wherein the federated learning cancellation message includes a reason for cancellation of participation in federated learning of the global machine learning model.

9. An apparatus comprising:

a processor; and a memory comprising computer-executable instructions that, when executed by the processor, cause the processor to perform the following operations:

receiving a configuration indicative of an instruction to participate in federated learning of a global machine learning model, the configuration including timing information related to said federated learning, wherein the timing information includes a specification of a timing of a periodic learning status report;

performing, based on the configuration, a machine learning process based on undertaken network performance related measurements, wherein the timing information includes a time limit with respect to a local machine learning model resulting from the machine learning process, wherein the time limit is a specification of a moment in time by when the local machine learning model is to be completed or a specification of a moment in time by when transmission of the local machine learning model is to be completed, and wherein the configuration is a minimization of drive tests configuration;

transmitting, based on the timing of the periodic learning status report, the periodic learning status report;

receiving a request for a requested learning status report;

transmitting the requested learning status report;

receiving a request for a requested periodic learning status report including a specification of a timing of the requested periodic learning status report; and transmitting, based on the timing of the requested periodic learning status report, the requested periodic learning status report, wherein the periodic learning status report, the requested learning status report and the requested periodic learning status report comprises a probability that the time limit is kept, progress information with respect to the machine learning process, and an estimated time for the machine learning process to be completed;

receiving a configuration modification related to participation in federated learning of the global machine learning model, wherein the configuration modification includes at least an indication of an increased frequency of network performance related measurements; and increasing the frequency of the undertaken network performance related measurements based on the configuration modification.

10. The apparatus according to claim 9, wherein the computer-executable instructions, when executed by the processor, further cause the processor to perform the following operation:

transmitting, upon completion of the machine learning process, a local machine learning model message including the local machine learning model, wherein the local machine learning model message includes a weight associated with the local machine learning model.

11. The apparatus according to claim 10, wherein the computer-executable instructions, when executed by the processor, further cause the processor to perform the following operations:

receiving a global machine learning model; and updating the local machine learning model based on the global machine learning model, wherein in relation to the updating, the local machine learning model is replaced by the global machine learning model.

12. The apparatus according to claim 11, wherein the computer-executable instructions, when executed by the processor, further cause the processor to perform the following operation:

transmitting an indication of capability to participate in federated learning.

13. The apparatus according to claim 12, wherein the computer-executable instructions, when executed by the processor, further cause the processor to perform the following operation:

transmitting an indication of inability to keep the time limit.

14. The apparatus according to claim 13, wherein the indication of inability to keep the time limit includes information on a reason for the inability to keep the time limit.

15. The apparatus according to claim 14, wherein the computer-executable instructions, when executed by the processor, further cause the processor to perform the following operation:

receiving a federated learning cancellation message; and cancelling the machine learning process based on the federated learning cancellation message.

16. The apparatus according to claim 15, wherein the federated learning cancellation message includes a reason for cancellation of participation in federated learning of the global machine learning model.

17. A system comprising:

an apparatus;

a processor; and a memory comprising computer-executable instructions that, when executed by the processor, cause the processor to perform the following operations:

receiving a configuration indicative of an instruction to participate in federated learning of a global machine learning model, the configuration including timing information related to said federated learning, wherein the timing information includes a specification of a timing of a periodic learning status report;

performing, based on the configuration, a machine learning process based on undertaken network performance related measurements, wherein the timing information includes a time limit with respect to a local machine learning model resulting from the machine learning process, wherein the time limit is a specification of a moment in time by when the local machine learning model is to be completed or a specification of a moment in time by when transmission of the local machine learning model is to be completed, and wherein the configuration is a minimization of drive tests configuration;

transmitting, based on the timing of the periodic learning status report, the periodic learning status report;

receiving a request for a requested learning status report;

transmitting the requested learning status report;

receiving a request for a requested periodic learning status report including a specification of a timing of the requested periodic learning status report; and transmitting, based on the timing of the requested periodic learning status report, the requested periodic learning status report, wherein the periodic learning status report, the requested learning status report and the requested periodic learning status report comprises a probability that the time limit is kept, progress information with respect to the machine learning process, and an estimated time for the machine learning process to be completed;

receiving a configuration modification related to participation in federated learning of the global machine learning model, wherein the configuration modification includes at least an indication of an increased frequency of network performance related measurements; and increasing the frequency of the undertaken network performance related measurements based on the configuration modification.

18. The system according to claim 17, wherein the computer-executable instructions, when executed by the processor, further cause the processor to perform the following operation:

transmitting, upon completion of the machine learning process, a local machine learning model message including the local machine learning model, wherein the local machine learning model message includes a weight associated with the local machine learning model.

19. The system according to claim 18, wherein the computer-executable instructions, when executed by the processor, further cause the processor to perform the following operations:

receiving a global machine learning model; and updating the local machine learning model based on the global machine learning model, wherein in relation to the updating, the local machine learning model is replaced by the global machine learning model.

20. The system according to claim 19, wherein the computer-executable instructions, when executed by the processor, further cause the processor to perform the following operation:

transmitting an indication of capability to participate in federated learning.

\* \* \* \* \*